United States Patent [19]

Faneuf

[11] Patent Number: 4,751,037
[45] Date of Patent: Jun. 14, 1988

[54] INJECTION MOLDING PROCESS WITH MOVABLE MOLD CORE AND INJECTION NOZZLE ASSEMBLY

[76] Inventor: Daniel Faneuf, P.O. Box 278, Milford, N.H. 03055

[21] Appl. No.: 97,161

[22] Filed: Sep. 16, 1987

Related U.S. Application Data

[62] Division of Ser. No. 842,301, Mar. 21, 1986, Pat. No. 4,717,327.

[51] Int. Cl.[4] .............................................. B29C 45/36
[52] U.S. Cl. ............................... 264/328.11; 264/334; 425/438; 425/441
[58] Field of Search .................. 425/190, 192 R, 188, 425/186, 526, 534, 537, 540, 541, 528, 569, 574, 575, 577, 594, 436 R, 438, 441, 451, 453, DIG. 10, DIG. 58, DIG. 239, DIG. 247, 533; 264/328.1, 328.8, 328.9, 328.11, 328.15, 516, 537, 334; 249/63

[56] References Cited

U.S. PATENT DOCUMENTS

| | | | |
|---|---|---|---|
| 2,700,178 | 1/1955 | Blake | 425/571 |
| 3,002,225 | 10/1961 | Goller | 425/533 |
| 3,115,682 | 12/1963 | Soubier et al. | 425/533 |
| 4,357,296 | 11/1982 | Hafele | 264/537 |

FOREIGN PATENT DOCUMENTS 61-262112  11/1986  Japan ................................. 425/438

Primary Examiner—Jan H. Silbaugh
Assistant Examiner—Jill L. Fortenberry

[57] ABSTRACT

An injection molding apparatus for forming plastic items employs a mold formed of tool members which mate to form a mold cavity. A mold core assembly includes a pull core adapted to extend into the mold cavity and a core support member from which the pull core depends. A nozzle is provided for introducing liquid plastic into a runner which communicates with the mold cavity. The nozzle has a retracted position and an injection position. The nozzle is attached to the core support member such that movement of the nozzle between the retracted position and the injection position causes movement of the pull core, and such that fluid may pass from the nozzle into the runner. The nozzle may be attached to the core support member in a manner to allow the pull core to move laterally with respect to said nozzle.

4 Claims, 3 Drawing Sheets

INJECTION MOLDING PROCESS WITH MOVABLE MOLD CORE AND INJECTION NOZZLE ASSEMBLY

RELATED APPLICATIONS

This application is a division of application Ser. No. 06/842,301, filed Mar. 21, 1986 now U.S. Pat. No. 4,717,327 issued Jan. 5,1988.

BACKGROUND OF THE INVENTION

This invention relates in general to injection molding apparatus and in particular to a novel pull core and nozzle arrangement in an injection molding apparatus and a method for operating the same.

In a standard injection molding apparatus which employs a pull core, ordinarily there are separate devices for retracting the nozzle from its injection position and for retracting the pull core from its molding position in the mold cavity. The nozzle is usually attached to an injection carriage which is movable along tie bars. The nozzle may then be moved away from its injection position by moving the entire injection carriage along the tie bars. The injection carriage is usually moved by a hydraulic device. In some instances, the nozzle must be moved in this manner from and to its injection position with each mold cycle. The pull core is also ordinarily moved to and from its molding position with each cycle. Likewise, the pull core is usually moved by a hydraulic device.

Ordinarily, the separate devices for moving the nozzle and the pull core are mounted on different sides of the mold. It is often economical to take advantage of gravitational forces to assist in removing the molded article from the core, and accordingly, the pull core and device moving the pull core may be mounted on the top of the mold, vertically aligned. In this instance, the injection carriage and device moving it are usually mounted on the side of the mold.

Injection molding apparatus designed in the above-described fashion have many disadvantages. The separate devices for moving the injection carriage and pull core are costly. Their relative movement must be timed and controlled by limit switches and other devices which add further cost and may add significantly to the amount of time required for each mold cycle. Additionally, devices commonly used for moving the pull core operate more slowly than the devices commonly used for moving the injection carriage and the time required for each mold cycle is unnecessarily long. Where the nozzle injects through a solid surface of the mold, the channel or runner providing a passage for fluid material from the nozzle to the mold cavity is longer than where the nozzle injects at the parting line between the mold halves. A longer runner adds time to the cycle, wastes material, and adds significantly to the expense of operating the apparatus. Finally, where the injection molding apparatus has the injection carriage mounted on the top for injection at the parting line, the device for retracting the pull core is usually mounted on the side in a manner that often makes changing the mold difficult and time consuming.

It is an object of the invention to provide an injection molding apparatus that is less expensive to manufacture and operate.

Another object of the invention is to provide an injection molding apparatus that requires fewer parts than existing injection molding apparatus.

Another object of the invention is to provide an injection molding apparatus having a reduced mold cycle time.

Another object of the invention is to provide an injection molding apparatus that allows for the easy change of molds.

Still another object of the invention is to provide an injection molding apparatus that may be operated with a reduced number of limit switches.

Still another object of the invention is to provide an injection molding apparatus having a short runner.

Still another object of the invention is to provide injection molding apparatus having an injection carriage and pull core mounted on the same side.

Still another object of the invention is to provide an injection molding apparatus having a single device for advancing and retracting both the nozzle and the pull core.

It is still another object of the invention to provide an injection molding apparatus having a nozzle connected to a pull core in a manner that permits the flow of material from the nozzle and into a runner which connects with the mold cavity.

According to the invention an injection molding apparatus for forming plastic items employs a mold formed of tool members which mate to form a mold cavity. A mold core assembly includes a pull core adapted to extend into the mold cavity and a core support member from which the pull core depends. A nozzle is provided for introducing liquid plastic into a runner which communicates with the mold cavity. The nozzle has a retracted position and an injection position. The nozzle is attached to the mold core assembly such that movement of the nozzle between the retracted position and the injection position causes movement of the pull core, and such that fluid may pass from the nozzle into the runner. The nozzle may be attached to the core support member in a manner to allow the core support member to move laterally with respect to the nozzle.

Also according to the invention in an injection molding apparatus for forming plastic articles employing tool members which mate to form a mold cavity and having a mold core assembly with a pull core adapted to extend into the mold cavity and a nozzle adapted to introduce liquid plastic into the mold cavity, a method for advancing and retracting the pull core is provided. The mold core assembly is attached to the nozzle. The nozzle is advanced in a manner to cause the pull core to move into its molding position. The nozzle may then be retracted in a manner to cause the pull core to move out of its molding position. The mold core assembly may first be aligned with respect to the mold cavity prior to advancing the nozzle, and the mold core assembly may be moved laterally out of alignment with the mold cavity after retracting the nozzle.

Further according to the invention, in an injection molding apparatus for forming plastic articles employing a fixed tool member and a movable tool member which mate to form a mold cavity, having a mold core assembly with a pull core adapted to extend into the mold cavity and a nozzle attached to the mold core assembly, the nozzle adapted to introduce fluid plastic through a runner and into the mold cavity, and the nozzle attached to the mold core assembly in a manner that permits the lateral movement of the mold core assembly with respect to the nozzle, a method for forming a plastic article is provided. The mold cavity is formed and the pull core is aligned with the mold cavity by moving the movable tool member into mating arrangement with the fixed tool member. The nozzle is advanced in a manner to cause the pull core to move into molding position and to cause the nozzle to mate with the runner. Fluid plastic is then injected into the mold cavity where it is allowed to harden. Next the nozzle is retracted in a manner to cause the pull core to withdraw from its molding position. Then the mold cavity is opened by moving the movable tool member laterally with respect to the fixed tool member. The pull core is also moved out of alignment with the mold cavity.

DETAILED DESCRIPTION OF THE DRAWINGS

Figure 1:
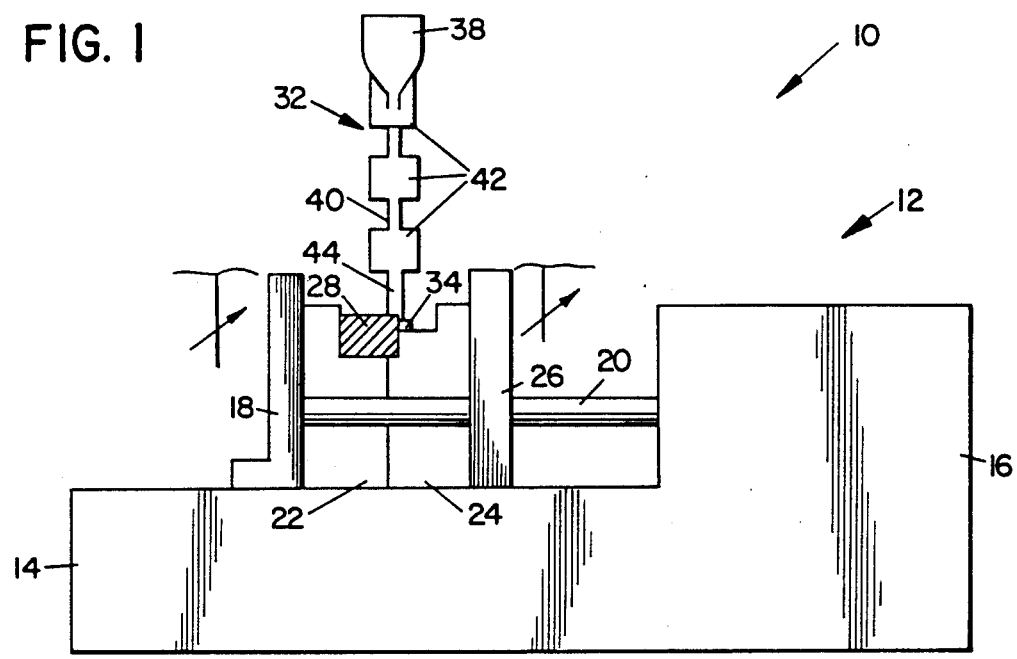
FIG. 1 is a schematic diagram of an injection molding apparatus according to the invention.

FIG. 1 is a schematic drawing of the preferred embodiment of the applicant's invention. The injection molding apparatus 10 has a frame 12 with a base portion 14 and an upright portion 16. A fixed platen 18 is immovably attached by conventional means to, and supported by, the base portion 14 of the frame 12. A pair of horizontal tie bars 20 (only one shown) are attached by conventional means to and run between the fixed platen 18 and the upper portion 16 of the frame 12. A fixed tool member 22 defines one of the mating members of the mold and is attached to fixed platen 18 by conventional means. Disposed between fixed tool member 22 and the upper portion 16 of frame 12 is movable tool member 24 which is attached by conventional means to movable platen 26. Horizontal tie bars 14 pass through movable platen 26 by conventional means and movable platen 26 may be moved horizontally to separate tool members 22 and 24 or to bring tool members 22 and 24 together in mating position. Movement is accomplished by conventional means well known to those skilled in the art. A mold core assembly 28 is movably attached to fixed tool member 22.

A pair of vertical tie bars (not shown) attaches to the horizontal tie bars 20. An injection carriage 32 (not fully shown) is attached by conventional means to and moves along the vertical tie bars to cause the vertical movement of the attached nozzle 34. The injection carriage generally consists of a carriage frame (not shown) which supports a conventional bin 38 for introducing solid material into the conduit 40 which is surrounded by heating elements 42. The solid material is melted and the liquid may pass through the barrel 44 to the nozzle. Such injection carriages are commercially available and their operation is well known to those skilled in the art.

Figure 2:
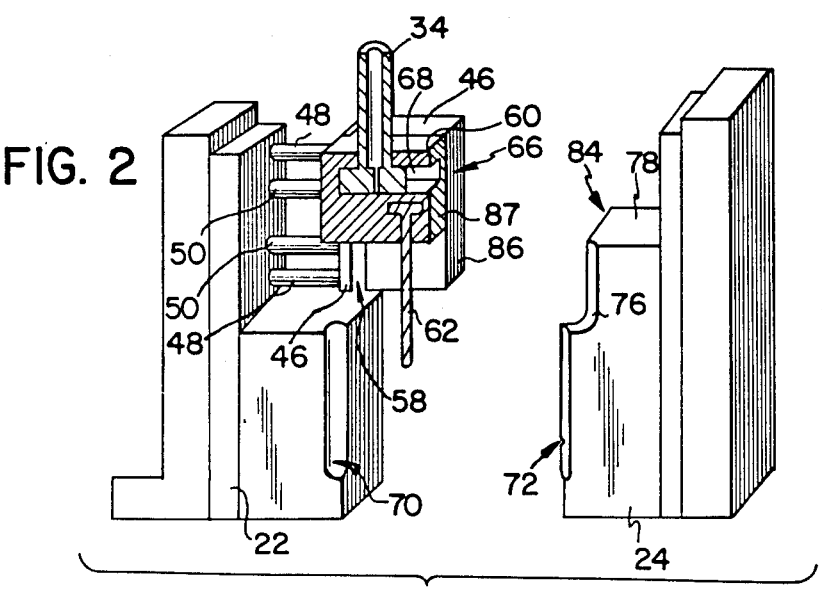
FIG. 2 is a cross-sectional view of the nozzle and mold core assembly with the pull core retracted and mold tool halves separated.
Figure 3:
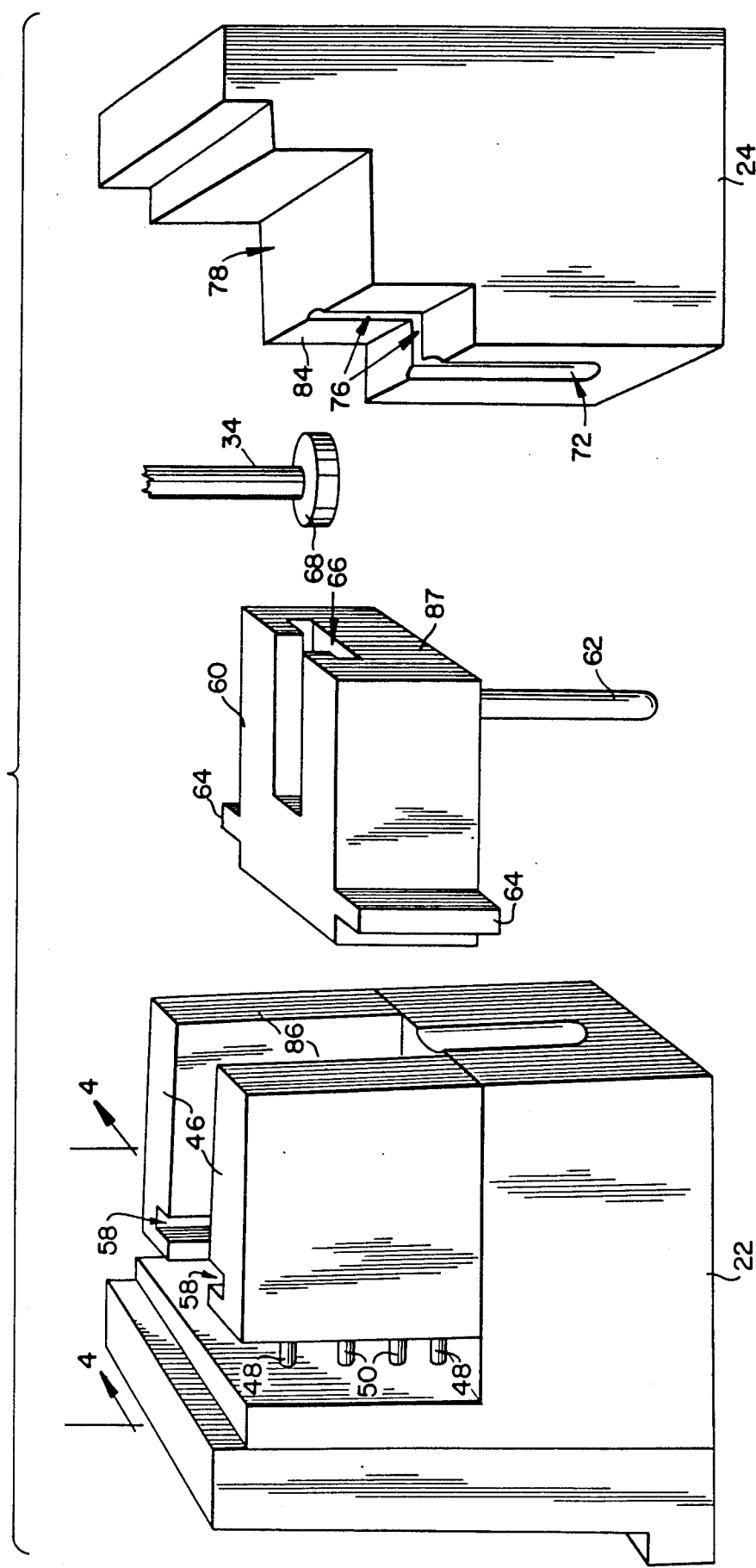
FIG. 3 is an exploded view of the mold, mold core assembly and nozzle.
Figure 4:
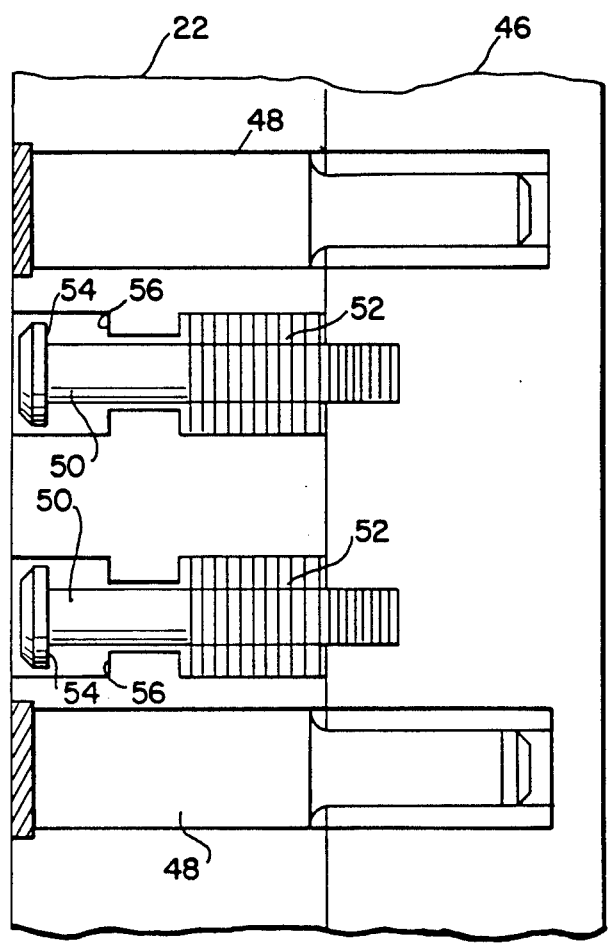
FIG. 4 is a schematic cross-sectional view along line 4—4 of FIG. 3.

FIGS. 2, 3 and 4 schematically illustrate the novel features of applicant's invention. The mold core assembly includes guide plates 46 which are attached to fixed tool member 22 by conventional pins and bushings 48 and shoulder screws or stripper bolts 50. This arrangement is schematically shown in FIG. 4. Pins and bushings 48 pass through fixed tool member 22 and guide plate 46 such that the guide plate 46, riding on the pins and bushings 48, may move away from tool member 22. The force causing this movement in the preferred embodiment is a stripper bolt 50 and spring arrangement. The die springs 52 exert a force pushing guide plate 46 away from fixed tool member 22. As guide plate 46 moves away from fixed tool member 22, stripper bolts 50 which are threadedly attached to guide plate 46 also moves. The movement is limited when the shoulders 54 of stripper bolts 50 come in contact with limit ridge 56 in the channel through which shoulder bolts 50 pass.

The mold core assembly also includes a core support member 60 which attaches with and supports pull core 62. As illustrated in FIG. 3, the core support member 60 has guide channel engaging arms 64 for engaging the guide channels 58 of guide plates 46. The core support member 60 is free to move within the channels 58 of the guide plates 46. The lateral movement of the guide plates 46 will cause the same movement of the core support member 60 and attached pull core 62 due to the interengagement of the arms 64 of the core support member 60 and the guide channels 58 of the guide plates 46.

The core support member 60 also includes a nozzle slot 66 which engages the flange 68 of the nozzle 34 in a manner that permits the core support member 60 to move laterally while the nozzle remains in fixed position, but permits no movement of the core support member 60 (and attached pull core 62) in a vertical direction absent movement of the nozzle. Thus, vertical movement of the nozzle 34 causes vertical movement of the pull core 62. Moreover, while the nozzle is fixed with respect to lateral movement, the pull core 62 may be moved laterally since the core support member 60 may slide laterally along its slot in relation to the fixed nozzle.

Figure 6:
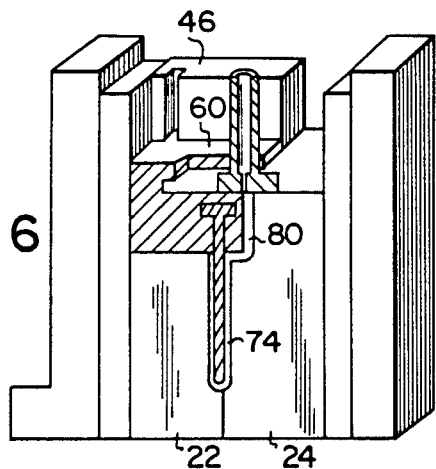
FIG. 6 is a cross-sectional view of the nozzle and mold core assembly in the molding position.

As shown in FIG. 3, fixed tool member 22 includes a first cavity 70 and movable tool member 24 includes a second cavity 72 which mate when tool members 22 and 24 are brought together to form the mold cavity 74 (FIG. 6). Movable tool member 24 also has a third cavity 76 which communicates with second cavity 72 and nozzle-abutting surface 78 of movable tool member 24. The core support member 60 mates and abuts with the movable tool member 24 to form a runner 80 defined by third cavity 76 and the abutting faces of the core support member 60 (FIG. 6). As is apparent from FIG. 6, material may be injected from the nozzle 34 through the runner 80 and into the mold cavity 74.

These schematic illustrations depict only a single mold cavity and single pull core. It should be noted that in practice it is expected and will be common to employ a mold having multiple cavities and a core assembly having multiple pull cores.

Figure 5:
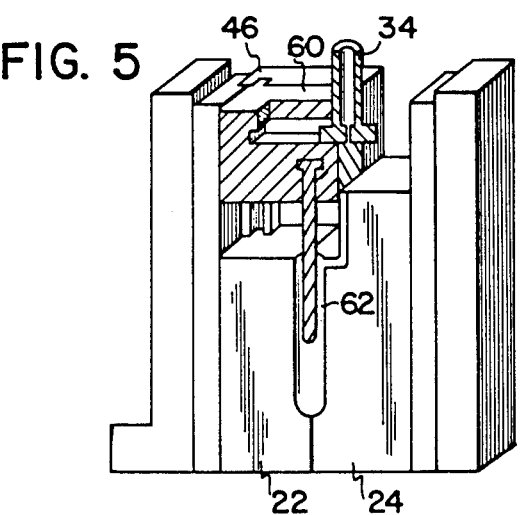
FIG. 5 is a cross-sectional view of the nozzle and mold core assembly with the pull core retracted.

The operation of applicant's invention is best illustrated by referring to FIGS. 2, 5 and 6. FIG. 2 illustrates applicant's invention in its resting state. The movable tool member 24 has been pulled away from the fixed tool member 22 by conventional means (not shown) and the mold core assembly including the attached pull core 62 has been moved vertically along the guide channel 58 of the guide plates 46 by retracting the injection carriage to which the nozzle is attached, and has been moved laterally away from fixed tool member 22 22 by the force of the die springs 52 against the guide plate 46. Next the movable tool member 24 is moved toward the fixed tool member 22 to form the mold cavity 74. As the movable tool member 24 is brought toward the fixed tool member 22, the guide plate support-engaging surface 84 of the movable tool member 24 contacts the surface 86 of the guide plate 46. This surface 86 extends fractionally beyond core support surface 87 such that there is no engagement of core support surface 87 with guide plate engaging surface 84 which might prevent the movement of the core support member 60 along the channels 58 of the guide plates 46. Surface 86 must not, however, extend to a degree where fluid would escape from the mold cavity or runner when the tool members are brought together and fluid is injected through the runner and into the mold cavity. As the movable tool member 24 continues to move toward the fixed tool member 22, the action of the guide plate engaging surface 84 against the surface 86 of the guide plate 46 moves the core support member 60 and attached pull core 62 laterally with respect to the fixed nozzle and fixed tool member 22 until the guide plates 46 abut the fixed tool member 22 as shown in FIG. 5. Next the nozzle moves downward causing the core support member 60 to move downwardly sliding in the guide channels 58 of guide plates 46 until the bottom of the core support member 60 abuts the fixed tool member 22 as shown in FIG. 6. In this manner, the pull core 62 is positioned in the mold cavity 74 and the mold cavity 74 is in communication with the nozzle 34 via the runner 80. At this time, the heated liquid material (not shown) is injected from the nozzle through the runner and into the mold cavity 74. The temperature of the tool members causes the material to harden. Subsequently, the nozzle 34 is caused to move vertically which results in the core support member 60 sliding vertically in the guide plates and the pull core withdrawing the desired amount from its position in the mold cavity. Next the movable tool member 24 is moved laterally separating it from the fixed tool member 22. This movement likewise allows the die springs 52 to move the guide plates 46 and attached core support member 60 and pull core 62 laterally away from the fixed tool member 22 as shown in FIG. 2. In this manner, the molded article is freed from the mold cavity and allowed to fall from the pull core 62.

It should be understood that various changes and modifications of the embodiments shown in the drawings may be made within the scope of this invention. Thus, it is intended that all matter contained in the above description or shown in the accompanying drawings shall be interpreted in an illustrative and not limiting sense.

What I claim is:

1. In an injection molding method for forming plastic articles employing tool members which mate to form a mold cavity and having a mold core assembly having a pull core adapted to extend into said mold cavity and a nozzle attached to said mold core assembly and adapted to introduce fluid plastic into said mold cavity, a method for advancing and retracting said pull core comprising, first moving said mold core assembly laterally into alignment with said mold cavity independent of any movement of said nozzle prior to advancing said nozzle, advancing said nozzle in a manner to cause said pull core to move into a molding position, and retracting said nozzle in a manner to cause said pull core to move out of said molding position, and moving said mole sore assembly laterally out of alignment with said mold cavity independent of any movement of said nozzle after retracting said nozzle.

2. In an injection molding method for forming plastic articles employing a fixed tool member and a movable tool member which mate to form a mold cavity, having a mold core assembly with a pull core adapted to extend into said mold cavity and having a nozzle attached to said mold core assembly, said nozzle adapted to introduce fluid plastic through a runner and into the mold cavity and said nozzle attached to said mold core assembly in a manner that permits the lateral movement of the mold core assembly with respect to said nozzle, a method for forming a plastic article comprising, forming said mold cavity and aligning said pull core with said mold cavity by moving said movable tool member into mating arrangement with said fixed tool member, advancing said nozzle in a manner to cause said pull core to move into a molding position and to cause said nozzle to mate with said runner, injecting said fluid plastic into said mold cavity, allowing said fluid plastic to harden, retracting said nozzle in a manner to cause said pull core to withdraw from said molding position, opening said mold cavity by moving said movable tool member laterally with respect to said fixed member, and moving said pull core out of alignment with said mold cavity independent of any movement of said nozzle.

3. A method as claimed in claim 2 further comprising the step of, forming said runner by mating said movable tool member with said mold core assembly.

4. A method as claimed in claim 2 wherein said pull core is moved out of alignment with said mold cavity by die springs contacting at one end said fixed tool member and at the other end said mold core assembly.

* * * * *